(12) United States Patent
Blackert et al.

(10) Patent No.: US 10,693,717 B2
(45) Date of Patent: Jun. 23, 2020

(54) ASSISTED PORT IDENTIFICATION BY CONNECTION AN ACTIVATION DEVICE TO A PHYSICAL PORT AND DETECTING A STATE CHANGE FOR A PARTICULAR SOFTWARE VIRTUAL INTERFACE

(71) Applicant: ADVA Optical Networking SE, Meiningen-Dreißigacker (DE)

(72) Inventors: William Blackert, Cary, NC (US); Brian Van Voorhis, Wake Forest, NC (US); Robert Woods, Apex, NC (US)

(73) Assignee: ADVA OPTICAL NETWORKING SE, Meiningen-Dreißigacker (DE)

( * ) Notice: Subject to any disclaimer, the term of this patent is extended or adjusted under 35 U.S.C. 154(b) by 273 days.

(21) Appl. No.: 15/888,013

(22) Filed: Feb. 3, 2018

(65) Prior Publication Data
US 2019/0245742 A1   Aug. 8, 2019

(51) Int. Cl.
*H04L 12/24* (2006.01)
*G06F 9/4401* (2018.01)

(52) U.S. Cl.
CPC ........ *H04L 41/0809* (2013.01); *G06F 9/4411* (2013.01); *H04L 41/0806* (2013.01); *H04L 41/0883* (2013.01)

(58) Field of Classification Search
CPC ............. H04L 41/0809; H04L 41/0806; H04L 41/0883; G06F 9/4411
See application file for complete search history.

(56) References Cited

U.S. PATENT DOCUMENTS

| | | | | |
|---|---|---|---|---|
| 5,923,643 A * | 7/1999 | Higgins | ................ | H04L 12/437 370/218 |
| 6,922,391 B1 * | 7/2005 | King | ...................... | H04L 45/00 370/229 |
| 7,061,858 B1 * | 6/2006 | Di Benedetto | ......... | H04L 41/00 370/219 |
| 7,836,332 B2 * | 11/2010 | Hara | ..................... | G06F 3/0607 714/5.11 |
| 7,860,961 B1 * | 12/2010 | Finkelstein | ......... | H04L 12/4641 709/201 |

(Continued)

OTHER PUBLICATIONS

Ip(8)—Linux man page, as archived at Archive.org at https://web.archive.org/web/20171022111509/https://linux.die.net/man/8/ip with an asserted collection date of Oct. 22, 2017, 17 pages as printed.

(Continued)

*Primary Examiner* — Daniel C. Murray
(74) *Attorney, Agent, or Firm* — Kevin E Flynn; Flynn IP Law (57) ABSTRACT

Process to associate a set of physical ports on a physical device with a set of software virtual interfaces. Process includes placing the set of software virtual interfaces to be associated with a set of N physical ports in an enabled state which has a first link state when no activation device is connected to a particular software virtual interface and a second link state when an activation device is connected to the particular software virtual interface. Connecting an activation device such as a loopback connector to a physical port to shift the software virtual interface to the second link state to map that particular physical port to that particular software virtual interface.

12 Claims, 5 Drawing Sheets

(56) References Cited

U.S. PATENT DOCUMENTS

| | | | | |
|---|---|---|---|---|
| 7,966,294 | B1* | 6/2011 | Gupta | G06F 3/0605 |
| | | | | 707/654 |
| 8,145,785 | B1* | 3/2012 | Finkelstein | H04L 49/357 |
| | | | | 370/401 |
| 8,683,478 | B2* | 3/2014 | Anderson | G06F 9/45558 |
| | | | | 718/104 |
| 8,743,872 | B2* | 6/2014 | Chidambaram | H04L 47/6205 |
| | | | | 370/386 |
| 8,761,187 | B2* | 6/2014 | Barde | H04L 49/70 |
| | | | | 370/386 |
| 8,856,340 | B2* | 10/2014 | Cardona | G06F 9/45558 |
| | | | | 709/220 |
| 9,043,452 | B2* | 5/2015 | Fulton | H04L 41/0896 |
| | | | | 707/714 |
| 9,218,195 | B2* | 12/2015 | Anderson | G06F 9/45558 |
| 9,361,045 | B1* | 6/2016 | Yang | H04L 67/1097 |
| 9,470,644 | B2* | 10/2016 | Remple | G06F 1/26 |
| 9,497,133 | B2* | 11/2016 | Srinivasan | H04L 12/28 |
| 9,787,546 | B2* | 10/2017 | Bardgett | H04L 41/12 |
| 9,894,091 | B1* | 2/2018 | Larha | H04L 63/1433 |
| 10,103,939 | B2* | 10/2018 | Koponen | H04L 41/0816 |
| 10,205,638 | B1* | 2/2019 | Angrish | H04L 41/22 |
| 10,432,475 | B2* | 10/2019 | Nair | H04L 12/4641 |
| 10,554,586 | B2* | 2/2020 | Cheloha | H04L 49/40 |
| 2001/0019553 | A1* | 9/2001 | Orsatti | H04Q 11/0478 |
| | | | | 370/386 |
| 2003/0023876 | A1 | 1/2003 | Bardsley et al. | |
| 2004/0151120 | A1* | 8/2004 | Shankar | H04L 49/90 |
| | | | | 370/249 |
| 2005/0001179 | A1* | 1/2005 | Gisler | G05B 23/0272 |
| | | | | 250/551 |
| 2005/0180398 | A1* | 8/2005 | Deno | H04L 41/0253 |
| | | | | 370/352 |
| 2006/0155837 | A1* | 7/2006 | Kobayashi | H04L 67/1097 |
| | | | | 709/223 |
| 2006/0277275 | A1* | 12/2006 | Glaenzer | H04L 67/14 |
| | | | | 709/219 |
| 2007/0291785 | A1* | 12/2007 | Sharma | H04L 41/082 |
| | | | | 370/464 |
| 2008/0144531 | A1* | 6/2008 | Fisher | A61P 27/02 |
| | | | | 370/255 |
| 2009/0144680 | A1* | 6/2009 | Lehavot | G06F 30/398 |
| | | | | 716/106 |
| 2010/0238837 | A1* | 9/2010 | Zheng | H04L 12/4679 |
| | | | | 370/254 |
| 2011/0320706 | A1* | 12/2011 | Nakajima | G06F 11/0727 |
| | | | | 711/114 |
| 2012/0151546 | A1* | 6/2012 | Mori | H04L 41/12 |
| | | | | 725/116 |
| 2013/0329547 | A1* | 12/2013 | Takase | H04L 41/0654 |
| | | | | 370/220 |
| 2014/0012966 | A1* | 1/2014 | Baphna | H04L 41/0816 |
| | | | | 709/221 |
| 2014/0047125 | A1* | 2/2014 | Hyoudou | H04L 49/70 |
| | | | | 709/232 |
| 2015/0049636 | A1* | 2/2015 | Tai | H04L 43/0817 |
| | | | | 370/254 |
| 2015/0137791 | A1* | 5/2015 | Remple | G01R 19/0084 |
| | | | | 324/76.11 |
| 2015/0271104 | A1* | 9/2015 | Chikkamath | H04L 12/4633 |
| | | | | 370/401 |
| 2016/0105381 | A1* | 4/2016 | Baphna | H04L 41/0816 |
| | | | | 709/221 |
| 2016/0359982 | A1* | 12/2016 | Shih | H04L 49/55 |
| 2017/0034597 | A1 | 2/2017 | Shih | |
| 2018/0241697 | A1* | 8/2018 | Cheloha | H04L 49/40 |

OTHER PUBLICATIONS

Mariyappan, Balakrishnan, 9 Linux ethtool Examples to Manipulate Ethernet Card (NIC Card), as posted at https://www.thegeekstuff.com/2010/10/ethtool-command/ with a date of Oct. 28, 2010, 8 pages as printed.

How can I clean up a spaghetti monster of cables?, as posted at https://serverfault.com/questions/7441/how-can-i-clean-up-a-spaghetti-monster-of-cables/7449#7449, dated not later than May 12, 2009, 5 pages as printed.

Ross, Christopher, Extended European Search Report for EPO Application 18214234.9-1224 (EPO version of the present application), May 31, 2019, 8 pages, European Patent Organization, Munich, Germany.

Broughton, Jayson, Fun with ethtool, Linux Journal, May 25, 2011, 7 pages, obtained by EPO Examiner on May 21, 2019 via https://www.linuxjournal.com/content/fun-ethtool, Linux Journal, LLC, Denver, Colorado, USA.

Gite, Vivek, Linux Identifying~Which NIC Is Which—Which NIC is eth0?, nixCraft, Jan. 17, 2008, 5 pages with commments, obtained by EPO Examiner on May 21, 2019 via https://www.cyberciti.biz/tips/which-nic-is-ethO.html.

Miller, David, Ethtool(8) (Ethtool version 3.16), Sep. 1, 2014, 9 pages, XP055590423, obtained by EPO Examiner dated May 21, 2019 via https://www.freebsd.org/cgi/man.cgi?query=ethtool&apropos=0&sektion=08,manpath=Debian+8.1.08,arch=default&format=html.

* cited by examiner

| Physical Port Name | Linux Ethernet Interface |
|---|---|
| 0.1 | eth2 |
| 0.2 | eth3 |
| 0.3 | eth0 |
| 0.4 | eth1 |

ASSISTED PORT IDENTIFICATION BY CONNECTION AN ACTIVATION DEVICE TO A PHYSICAL PORT AND DETECTING A STATE CHANGE FOR A PARTICULAR SOFTWARE VIRTUAL INTERFACE

BACKGROUND

Field of the Disclosure

This disclosure relates generally to cloud or virtualized computing and the use of generic computers or "servers."

In software-centric applications, it is desirable to be able to use a wide variety of servers. These generic servers are often referred to as commercial off-the-shelf or COTS server.

One drawback of COTS devices is there is no defined or predictable relationship between the server's physical Ethernet ports and the internal representation. The leftmost physical port on one COTS server might be externally represented as "Port 1" and internally represented as "eth1." On another server, the leftmost "Port 1" might be internally represented as "eth3." A user may add cards to the device to add additional physical ports. Thus there may be two or more clusters of physical ports and the role of the physical ports may not be readily apparent from viewing the external surfaces of the physical device. A device with more physical ports than required for the current use may not remove and replace a malfunctioning physical port but may simply change the operation to ignore the malfunctioning physical port.

This variability complicates installation and operation of software on a variety of devices. The hosted software must have some mapping of external physical ports to internal virtual ports. The problem lies in how to determine this mapping in an efficient manner.

One approach would be for the system operator ("user") to manually determine the mapping of ports. Typically this approach requires the user to research the Linux interface name usage and how it relates to the physical ports on a given server. An alternative would be to resort to a trial and error process to define this mapping by connecting the various communication cables to various physical ports and hoping that the guessed mapping works.

In either case, those approaches are a time consuming and error prone process, especially with inexperienced users or new server hardware. In addition, the mapping may not be as simple at eth0, eth1, eth2, eth3 maps to ports 1, 2, 3, 4.

Figure 1:
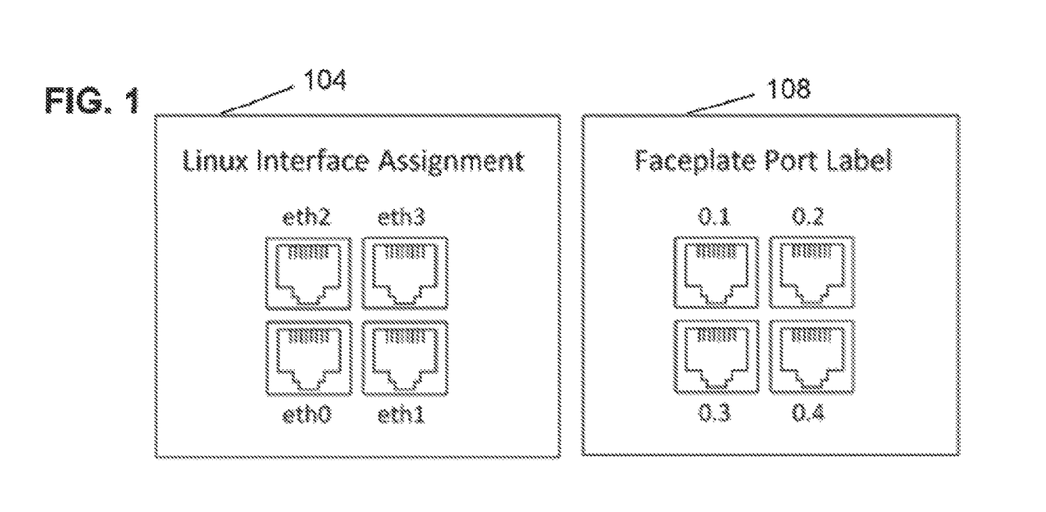
FIG. 1 depicts the Linux assignment of interfaces versus the labels on the external faceplate.

Here is a real world example of a COTS server running a Linux operating system. FIG. 1 displays the example hardware configuration. In this case there are four Ethernet ports arranged with two rows of two ports. In this example, the bottom row of ports is assigned to a numerically lower PCI address than the top row of ports. (For sake of context, PCI is the Peripheral Computer Interconnect and is a local computer bus for attaching hardware to a computer). As a result, the set of Linux Ethernet interface names 104 on the bottom row with eth0 and eth1 and the top row containing interface eth2 and eth3. However, the physical faceplate presents the set of external port names 108 visible to the user starting on the upper row as port 0.1 and 0.2 followed by the lower port names of 0.3 and 0.4. Therefore, the mapping of external port name 108 to internal Ethernet interface 104 would not be a straightforward mapping of numerically increasing port name to interface name.

Figure 2:
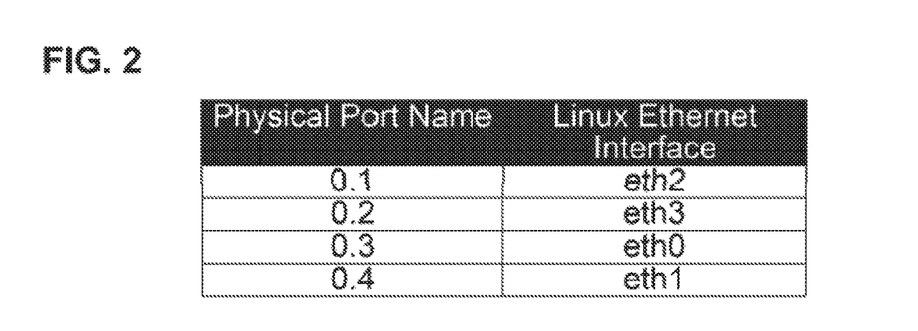
FIG. 2 depicts a table that maps between the physical port name and the Linux name for the interface.

An explicit mapping is required between the physical port names and the logical port names. An example of this mapping is shown in FIG. 2.

Note while the physical port names are provided in this example as physical ports 0.1, 0.2, 0.3, and 0.4, the physical port names may be A, B, C, D or WAN, LAN 1, LAN 2, LAN 3, and AUX as the four ports may be used to connect to a Wide Area Network, several local area networks, and to an external memory device.

One prior art method for locating the physical port location is through the use of a Linux tool named "ethtool." (see—https://en.wikipedia.orgkwiki/Ethtool) This tool contains an "identify" option to trigger the LEDs on the Ethernet port to blink for a given Ethernet interface. In this case, a user would run the ethtool utility specifying the Linux Ethernet interface name along with the "identify" option. Often this results in a blinking LED on the physical port that one can use to map the internal Linux Ethernet interface to the physical port. A problem with this approach is that not all hardware vendors support this functionality, resulting in no blinking LED. In addition, using ethtool requires access to a Linux command line at a privileged level along with some basic Linux knowledge.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

As noted in the abstract that accompanies this document, a way to begin to think about the teachings of the present disclosure is to consider that this disclosure addresses a process to associate a set of physical ports on a physical device with a set of software virtual interfaces. The process includes placing the set of software virtual interfaces to be associated with a set of N physical ports in an enabled state which has a first link state when no activation device is connected to a particular physical port and a second link state when an activation device is connected to the particular physical port. The process includes connecting an activation device such as a loopback connector to a physical port to shift the software virtual interface to the second link state to map that particular physical port to that particular software virtual interface.

Thus, this summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provide below as one of skill in the art will recognize that inventive concepts illustrated in various examples can be combined together in order to address a specific application.

Other systems, methods, features and advantages of the disclosed teachings will be immediately apparent or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The present disclosure describes a method for simplified identification and mapping of physical network port names to a Linux Ethernet interfaces or other software virtual interfaces by using an external activation device, being either a connection to an active Ethernet network element or a passive loopback connector.

One advantage of the present disclosure over the ethtool solution is that the interface identification and mapping is performed automatically when an activation device is inserted into a network port by an unskilled user. No knowledge of Linux is required, and there is no dependence on the operation of set of LEDs on a given server.

While the activation device could be a connection to an active Ethernet network element, it is convenient to have a small loopback connector for use with this process as the activation device. The loopback connector is any device that connects the transmit connections directly to the receive connections on the Ethernet port.

Figure 3:
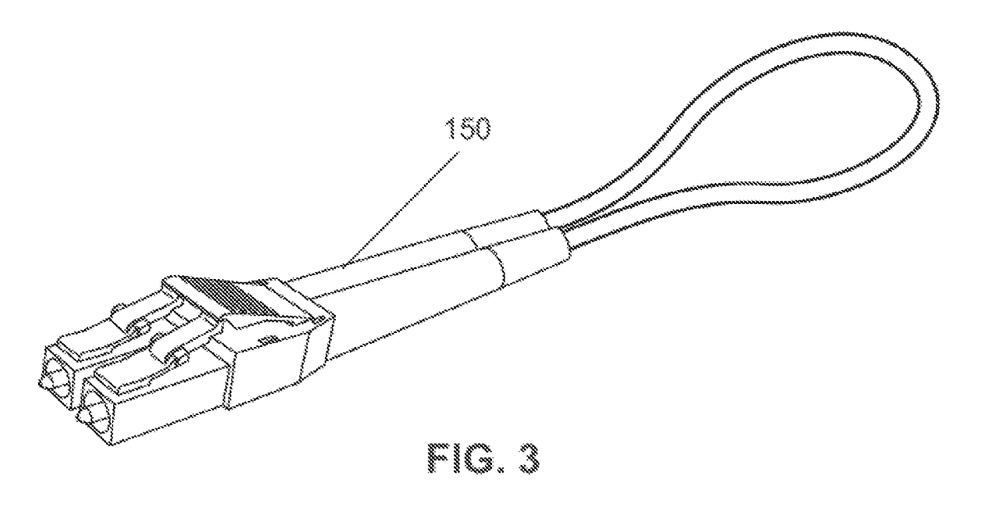
FIG. 3 depicts a fiber optic loopback connector plug.
Figure 4:
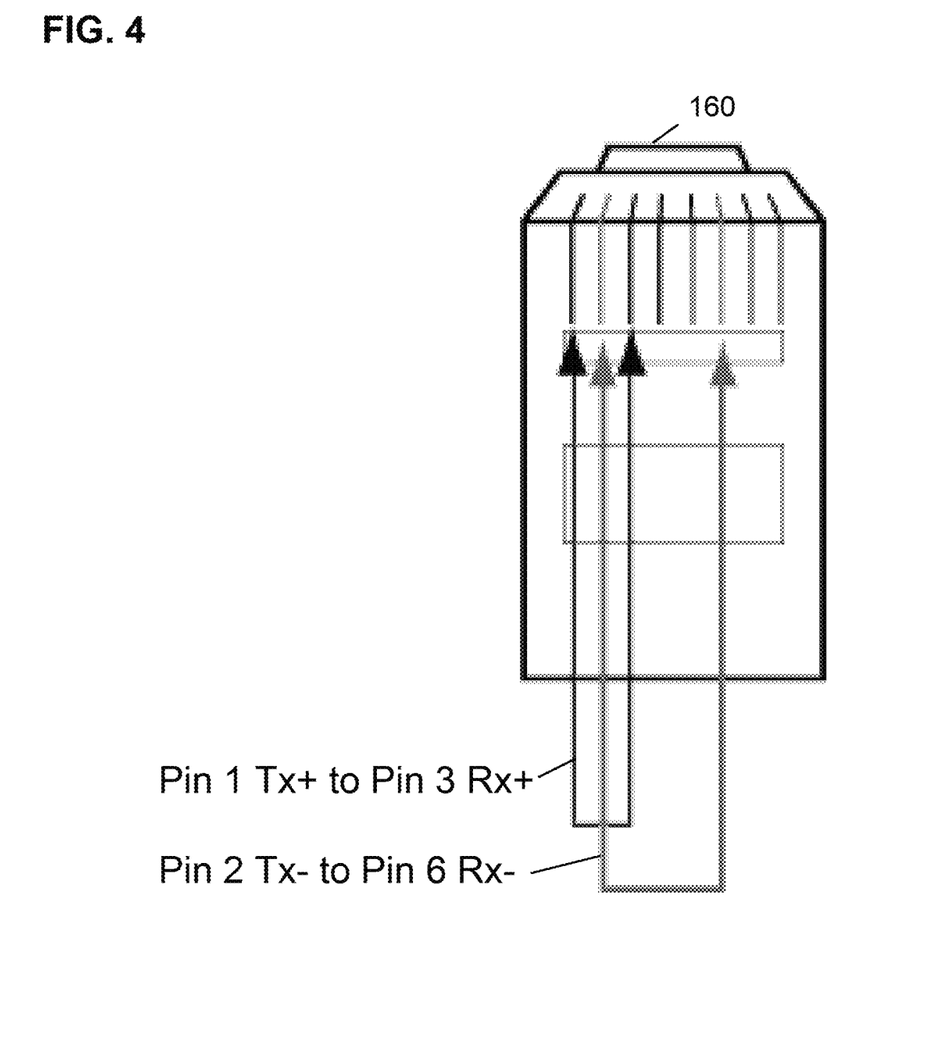
FIG. 4 depicts an Ethernet loopback connector plug.

For fiber, this is a simple loop of fiber from transmit to receive as shown in loopback connector 150 in FIG. 3. For metallic Ethernet, this is a connection between transmit and receive for each paired signal as shown in the wiring diagram for loopback connector 160 in FIG. 4. Loopback connector 160 is appropriate for an RJ-45 port. Loopback tools are known in the art and are sometimes used as an aid in testing physical connection problems.

The teachings of the present disclosure could be adapted for other physical ports beyond a fiber optic port or a FJ-45 port as long as the transmit connections are connected to the receive connections in order to cause the state change from link down to link up as used in the disclosed method.

Overview of the Process.

The present disclosure takes advantage of the Ethernet link state that is reported as "up" when an activation device is connected to the physical network port. A user is requested by a screen prompt issued by the device set-up software to insert the activation device into the port they would like to define as a particular physical port and once the activation device is connected, the assisted port identification process creates the mapping between that particular physical port and the Linux interface that is identified as reporting a link up state. The name of the particular physical port may be rather generic such as Port 1 or may be specific to the application such as WAN, LAN-1, or Memory.

The user is then instructed to insert the activation device into the next port and this process continues until all physical network ports are mapped to a set of Linux Ethernet interfaces. This method greatly simplifies defining the mapping of physical network ports to Linux interfaces by taking advantage of the link up state and does not depend on hardware that supports manual blinking of the LEDs at the physical ports.

Process Details.

The process starts by first enabling all Linux Ethernet interfaces which puts each interface into a state where the link state is reported as down, but if an activation device is connected, then the link state will transition to link up.

Once all interfaces are enabled, the user is prompted to connect the activation device to what the user considers to be port 1 or whatever is the first port name to be identified such as WAN. Thus a particular company could have port 1 as the upper left port, the lower left port, or some other port based upon client preference. After the user acknowledges that the activation device is connected, each Ethernet interface is scanned to discover the particular Linux Ethernet interface that is now reporting link up. The mapping between the Linux Ethernet interface to the port name being prompted can now be stored for future use.

Finally, the user is prompted to disconnect the activation device and then connect the activation device into the next port to be discovered. This process continues until all ports and Linux Ethernet interfaces are mapped.

Figure 5:
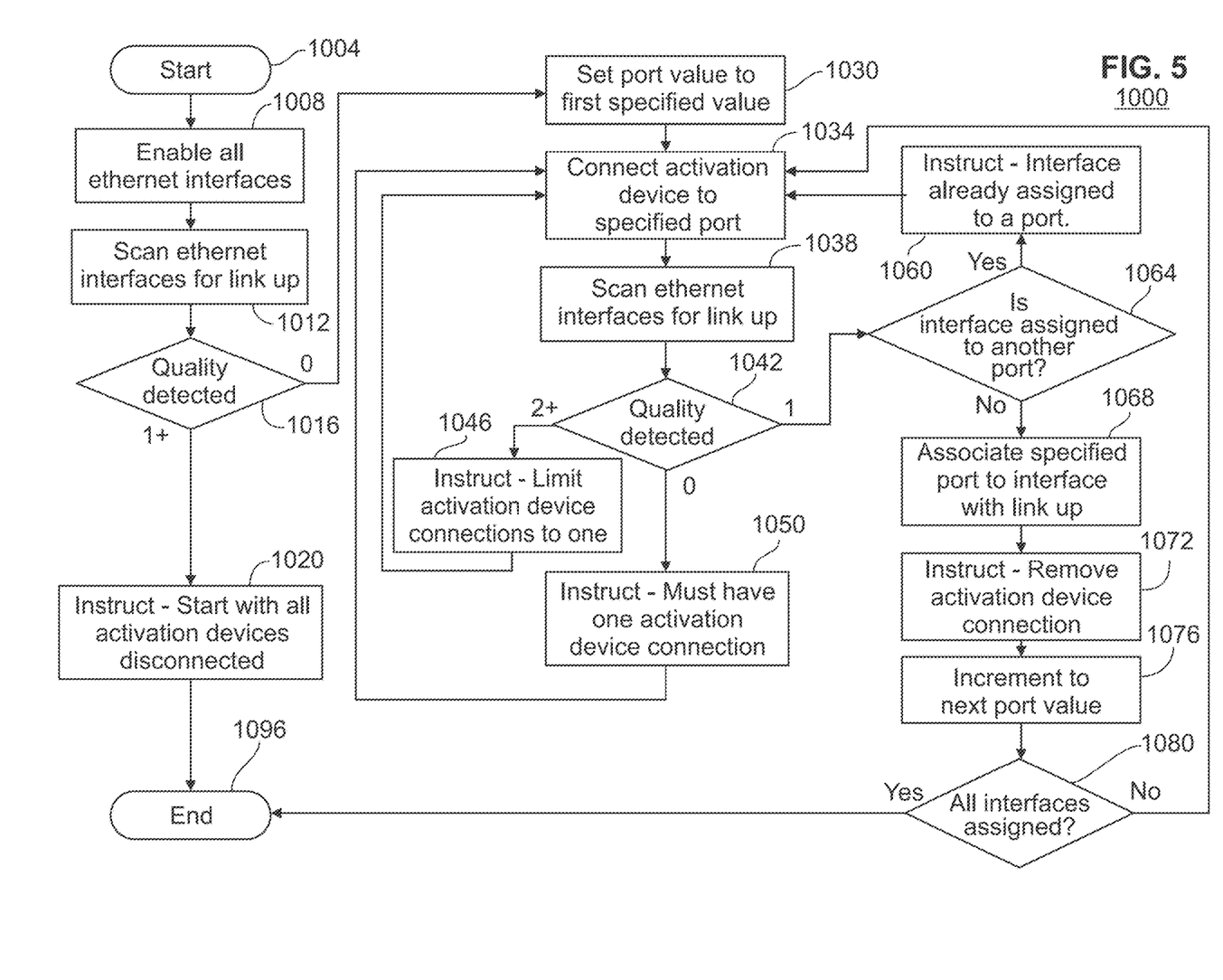
FIG. 5 depicts a detailed flow chart for port identification.

FIG. 5.

A more detailed description of the process 1000 used to map the physical network port to the Linux Ethernet interface including additional validations is shown in the FIG. 5.

A description of the detailed process is described in the following steps:

Step 1004—Start.

Step 1008—Enable all Ethernet interfaces on the hardware requiring identification. This puts the interface in a mode where the link state is reported as down when no activation device is present, but will switch to link up when an activation device is connected.

Step 1012—Scan all Ethernet interfaces in attempt to locate any ports that are already in a link up state.

Branch 1016

If any interface is already in a link up state, process cannot proceed as the activation device for port identification has not yet been inserted, so there must be something else already connected. Communicate message 1020 to remind user that all activation devices connections to the ports to be identified must be removed before starting. Then go to end 1096 to await a new start.

If all ports are in link down state, the process can proceed to step 1030.

Step 1030—set port value to a first specified value. This may be port 1 or otherwise start at the beginning of the set of ports to be identified such as WAN.

Step 1034—Request the user to connect an activation device to the physical port that the user associates with the current specified port name in the list of physical ports.

Step 1038—Scan all Ethernet interfaces in attempt to locate any ports that are now in a link up state.

Branch 1042:
- If no interface is in a link up state, the scan was unable to locate a port with an activation device connected. This indicates a problem with the port or an activation device was not correctly connected or the connected activation device is not functional. Therefore, the process cannot proceed without first connecting a functioning activation device to a physical port. Provide a message 1050 to the user to connect a functioning activation device and return to step 1034. One of skill in the art will recognize that the return could be to step 1038 as an alternative.
- If more than one interface is in a link up state, the process cannot proceed as only one activation device should be inserted. The user must remove the additional activation device to proceed. Provide a message 1046 and return to step 1034.
- If a single Ethernet interface is in a link up state, then a single port mapping is identified and further validation occurs at branch 1064.

Branch 1064:
- If the Ethernet interface that is reporting link up is already assigned to another physical port name, then the process cannot continue as two physical port names cannot be assigned to a single Linux interface. This situation could happen if the user connects the activation device to a previously assigned physical port. The user must connect the activation device with another physical port before proceeding. Proceed to Step 1060 to notify user and then return to step 1034.
- If the interface that is reporting link up is not currently assigned to another physical port name, then the particular physical port selected by the user by connecting the activation device is mapped to the Linux Ethernet interface that is reporting the link up state. The process can proceed to step 1068.

Step 1068—Associate the current physical port with the connected activation device to the Linux Ethernet interface with the new link up status.

Step 1072—Request User disconnect the activation device from the port just associated with a particular Linux Ethernet interface.

Step 1076—Increment the port value N by 1 or otherwise advance in the list of port names.

Branch 1080:
- If the incremented port value exceeds the set of ports to be associated with Linux Ethernet interfaces to be associated with physical ports, then go to end 1096.
- Otherwise, go to step 1034 and continue the process of identifying another physical port to associate with another particular Linux Ethernet interface.

One of skill in the art will recognize that the looping to check for completion of the process to associate all physical ports to virtual ports could be performed before incrementing the port name.

Figure 6:
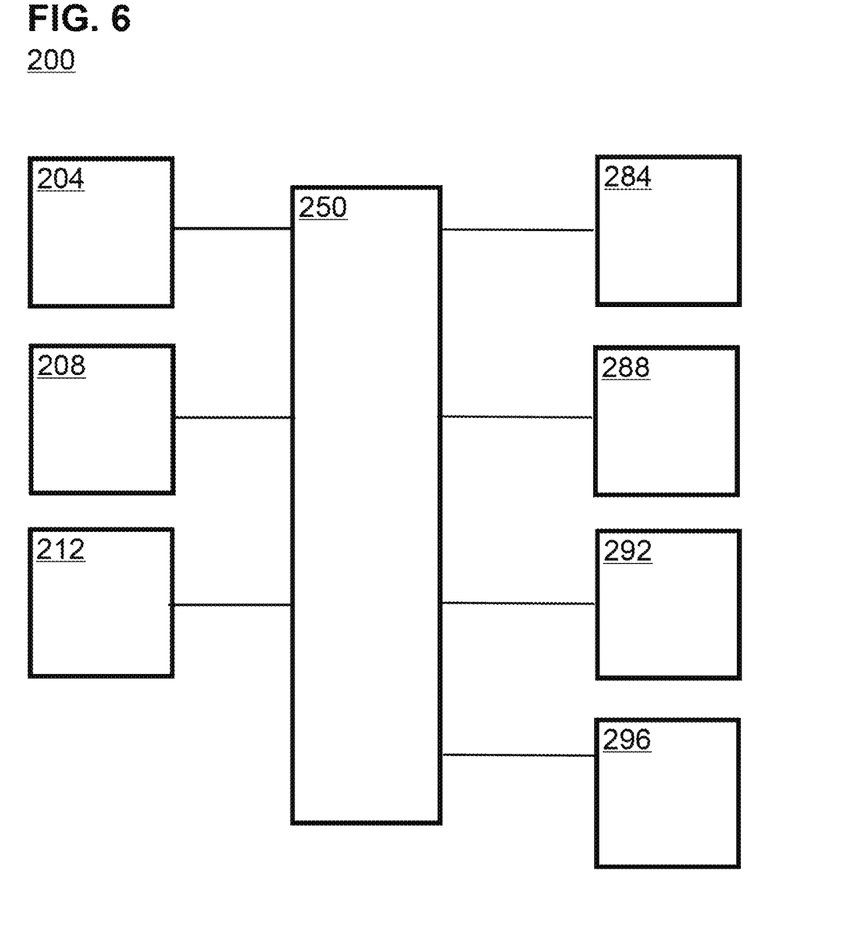
FIG. 6 provides a high level representation of a physical device loaded with software that includes instructions to implement the teachings of the present disclosure.

FIG. 6 provides a high level representation of a physical device 200 loaded with software that includes instructions to implement the teachings of the present disclosure. A physical device 200 having at least one processor 204 executes instructions stored in memory 208. The instructions are sufficient to implement the teachings of this disclosure or to allow access to additional instructions via one or more communication links (not shown here).

The physical device 200 has at least one user interface device 212 suitable to interact and to provide instructions to the user to allow the user to interact with the device to implement the process of associating a set of physical ports (284, 288, 292, and 296) to a corresponding set of software virtual interfaces created and maintained by instructions used by the processor. Note—nothing in this disclosure should be interpreted as limiting the number of physical ports to precisely four ports as the teachings of the present disclosure would be of use whenever there is more than one physical port. The components within device 200 may communicate with other components via one or more communication buses 250.

One of skill in the art will recognize that FIG. 6 omits many components found within a physical device 200 such as a power supply. However, FIG. 6 meets or exceeds the obligation of an applicant to furnish a drawing set in a nonprovisional application that shows every feature of the invention specified in the claims (37 CFR § 1.83).

ALTERNATIVES AND VARIATIONS

Change in Physical Ports.

If the port mapping needs to be updated for any reason including the addition or removal of physical ports, the process is capable of running multiple times to allow for updates to the port map.

Verification of Port Function.

Once all of the port mappings are defined, the process is also capable of establishing a connection to known addresses to further verify connectivity. For example, an interface that is now mapped to a WAN port could attempt to communicate with a remote IP address that is only accessible through a WAN connection.

Another possibility would be to use the functionality of the remote IP address to determine the function of the port. The learned association would then be between a physical port and the function of the remote end of the connection.

Not Limited to Linux.

In order to avoid a fuzzy disclosure, specific examples were provided which referenced the use of Linux or Linux tools. While the teachings of the present disclosure may be used in a Linux environment, Linux is not a requirement. Any other environment where software may be loaded onto a physical device with at least two physical ports could benefit from the teachings of the present disclosure. One such example is Microsoft Windows.

Use of More than One Activation Device.

In many instances, the process will use a single activation device such as a single loopback device, and simply move that single activation device from the first physical port to be associated with a software virtual interface through the sequence of physical ports and software virtual interfaces. Thus, at any given time there is either zero activation devices connected to the array of physical ports or just one activation device connected to the array of physical ports. While this may be the most common implementation, it is not a requirement.

The process could sequentially add a new loopback device or other activation device to each new physical port to be associated with a software virtual interface and detecting the new state change from down to up. Thus the final physical port could be identified by connecting an Nth activation device to the array of physical ports while leaving connected N−1 previously connected activation devices.

Assumptions About the Last Physical Port.

One of skill in the art will recognize that if N physical ports need to be associated with N software virtual interfaces that after successfully associated the N−1 physical port to the N−1 software virtual interface that the remaining physical port could be assumed to be the physical port to associate with the remaining software virtual interface.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A method to associate a set of physical ports on a device with a set of software virtual interfaces:
    the method comprising:
        placing the set of software virtual interfaces to be associated with a set of N physical ports in an enabled state which has a first link state when no activation device is connected to a particular physical port and a second link state when an activation device is connected to the particular physical port;
        connecting a first activation device to a first physical port selected by a user;
        detecting a change of state from the first link state to the second link state for a first particular software virtual interface;
        associating the first physical port with the first particular software virtual interface;
        connecting an activation device to a second physical port selected by the user;
        detecting a change of state from the first link state to the second link state for a second particular software virtual interface;
        associating the second physical port with the second particular software virtual interface; and
        connecting at least one piece of equipment to the first physical port for use with software to be run on the device in reliance of the previously determined association between the first physical port and the first particular software virtual interface.

2. The method of claim 1 wherein connecting an activation device to a second physical port selected by the user is achieved by disconnecting the first activation device from the first physical port selected by the user and connecting the first activation device to the second physical port selected by the user.

3. The method of claim 1 wherein connecting an activation device to a second physical port selected by the user is achieved by obtaining a second activation device different from the first activation device which is connected to the first physical port selected by the user and connecting the second activation device to the second physical port selected by the user.

4. The method of claim 1 wherein the set of software virtual interfaces is created using Linux.

5. The method of claim 1 wherein the set of software virtual interfaces is created using Windows.

6. The method of claim 1 wherein the activation device is an electrical Ethernet loopback plug.

7. The method of claim 1 wherein the activation device is a fiber optic loopback plug.

8. The method of claim 1 wherein the activation device is a connection to an active electrical Ethernet port.

9. The method of claim 1 wherein the activation device is a connection to an active optical Ethernet port.

10. The method of claim 1 wherein the first physical port selected by the user is Port 1.

11. The method of claim 1 wherein the first physical port selected by the user is a WAN port.

12. A physical device comprising:
    at least one processor for executing instructions;
    at least one user interface device to interact with the user to execute the method of claim 1;
    a set of physical ports;
    at least one communication bus to allow for communication between components within the physical device; and
    at least one memory device containing instructions for operation of the physical device including instructions sufficient to:
        create a set of software virtual interfaces;
        interact with the user to execute the method of claim 1 to associate the set of physical ports on the physical device with the set of particular software virtual interfaces when the user reacts to prompts to connect an activation device to a physical port; and
    process communications received from external devices at the set of physical ports in accordance with the previously established association of the set of physical ports on the physical device with the set of particular software virtual interfaces.

* * * * *